US010866795B2

(12) United States Patent
Sakai

(10) Patent No.: US 10,866,795 B2
(45) Date of Patent: Dec. 15, 2020

(54) INFORMATION PROCESSING APPARATUS AND INFORMATION DISPLAY METHOD

(71) Applicant: CANON KABUSHIKI KAISHA, Tokyo (JP)

(72) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 16/121,881

(22) Filed: Sep. 5, 2018

(65) Prior Publication Data
US 2019/0073207 A1 Mar. 7, 2019

(30) Foreign Application Priority Data
Sep. 7, 2017 (JP) .................................. 2017-172428

(51) Int. Cl.
G06F 8/61 (2018.01)
G06F 9/451 (2018.01)
G06F 9/445 (2018.01)
H04N 1/00 (2006.01)
G06F 3/0481 (2013.01)

(52) U.S. Cl.
CPC ............ G06F 8/62 (2013.01); G06F 3/04817 (2013.01); G06F 8/61 (2013.01); G06F 9/4451 (2013.01); G06F 9/451 (2018.02); H04N 1/00395 (2013.01); H04N 2201/0094 (2013.01)

(58) Field of Classification Search
None
See application file for complete search history.

(56) References Cited

U.S. PATENT DOCUMENTS

| 6,091,416 A * | 7/2000 | Cragun | G06F 3/04817 |
| | | | 715/837 |
| 7,426,048 B2 | 9/2008 | Sakai et al. | |
| 8,843,853 B1 * | 9/2014 | Smoak | H04L 67/18 |
| | | | 715/839 |
| 9,015,628 B2 | 4/2015 | Kuroyanagi | |
| 2005/0109828 A1 * | 5/2005 | Jay | G06F 9/4451 |
| | | | 235/375 |
| 2009/0007130 A1 | 1/2009 | Sakai et al. | |

(Continued)

FOREIGN PATENT DOCUMENTS

JP 2012027662 A 2/2012

OTHER PUBLICATIONS

Zujic, Bogdana. "Home » Technology » How to » How to Delete Apps on iPhone and iPad How to Delete Apps on iPhone and iPad." Technobezz, Jul. 21, 2018, www.technobezz.com/how-to-delete-apps-on-iphone-and-ipad/. Accessed Jun. 22, 2020. Year: 2018).*

Primary Examiner — Wei Y Zhen
Assistant Examiner — Binh Luu
(74) Attorney, Agent, or Firm — Venable LLP

(57) ABSTRACT

A user that installed an application, user information regarding a user who is registered as frequently using the application, and the application are managed in association, and at the time of menu display, display of icons is controlled according to whether or not a logged-in user is included in the user information associated with the application. In addition, control is performed such that, when uninstalling an application, the application is actually uninstalled or only user information is deleted based on user information associated with the application.

8 Claims, 13 Drawing Sheets

(56) References Cited

U.S. PATENT DOCUMENTS

| | | | |
|---|---|---|---|
| 2009/0100361 A1* | 4/2009 | Abello | H04N 5/4403 |
| | | | 715/764 |
| 2010/0088615 A1* | 4/2010 | Matsunobu | G06F 16/9577 |
| | | | 715/760 |
| 2012/0131451 A1* | 5/2012 | Abe | G06F 40/169 |
| | | | 715/260 |
| 2013/0067451 A1* | 3/2013 | Hussain | G06F 8/61 |
| | | | 717/172 |
| 2013/0337873 A1* | 12/2013 | Yang | H04M 1/0266 |
| | | | 455/566 |
| 2014/0047458 A1* | 2/2014 | Li | H04M 1/72525 |
| | | | 719/315 |
| 2015/0066980 A1* | 3/2015 | Kim | G06F 16/532 |
| | | | 707/769 |
| 2017/0097743 A1* | 4/2017 | Hameed | G06F 3/0482 |
| 2017/0149952 A1* | 5/2017 | Sarkaria | G06F 8/60 |
| 2017/0212744 A1* | 7/2017 | Okamoto | G06F 8/62 |

* cited by examiner

FIG 4

| 401 | 402 | 403 | 404 | 405 |
|---|---|---|---|---|
| AppID | DISPLAY NAME | ICON | INSTALLATION USER TYPE | USER INFORMATION |
| 0x0001 | COPY | /ic/copy.png | SYSTEM | — |
| 0x0002 | TRANSMISSION | /ic/send.png | SYSTEM | — |
| 0x0003 | BROWSER | /ic/brws.png | SYSTEM | — |
| 0x0004 | ADD/REMOVE APPLICATION | /ic/amng.png | SYSTEM | — |
| 0xf001 | 2 in 1 | /ic/copy.png | GENERAL | user1 |
| 0xf002 | BOOKBINDING COPY | /ic/copy.png | GENERAL | user1 user2 |
| 0xf003 | TRANSMISSION TO LOGGED-IN USER | /ic/send.png | ADMINISTRATOR | user0 |
| 0xf004 | SMB TRANSMISSION | /ic/send.png | GENERAL | user1 user3 |
| 0xf005 | CLOUD TRANSMISSION | /ic/send.png | GENERAL | user1 user2 |
| 0xf006 | MAIL TRANSMISSION | /ic/send.png | GENERAL | user1 |

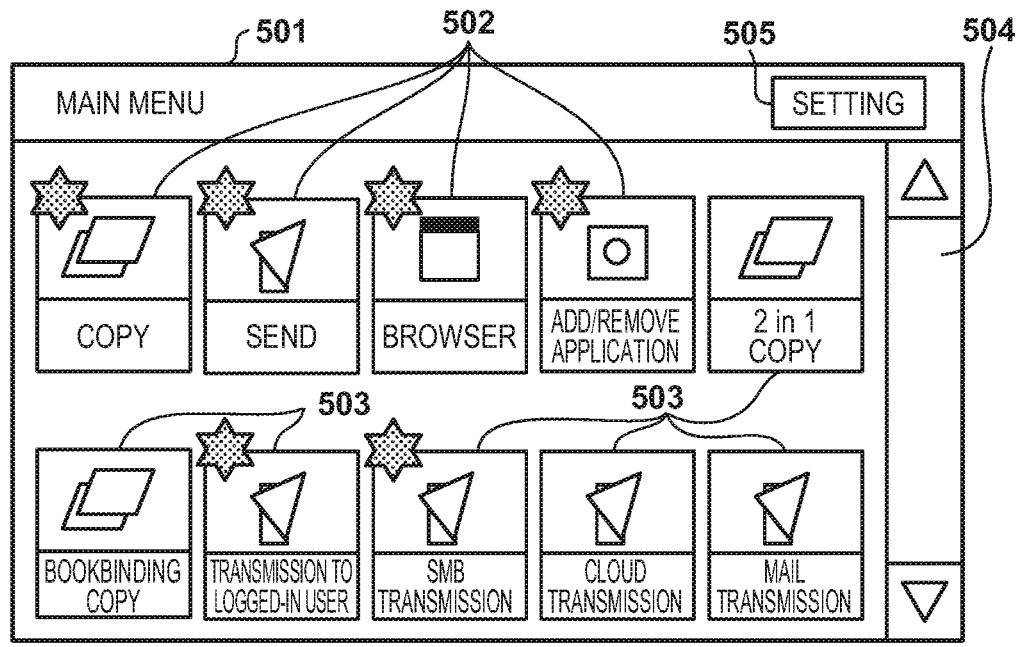

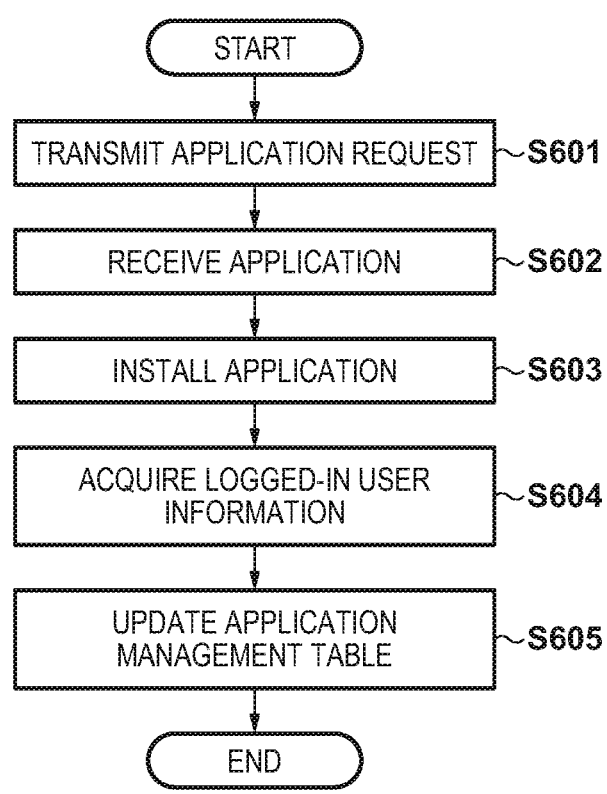

| USER NAME | PASSWORD | USER TYPE | DISPLAY SETTING |
|---|---|---|---|
| user0 | passwd0 | ADMINISTRATOR | TRANSPARENT |
| user1 | passwd1 | GENERAL | REDUCED |
| user2 | passwd2 | GENERAL | REDUCED |
| user3 | passwd3 | GENERAL | TRANSPARENT |

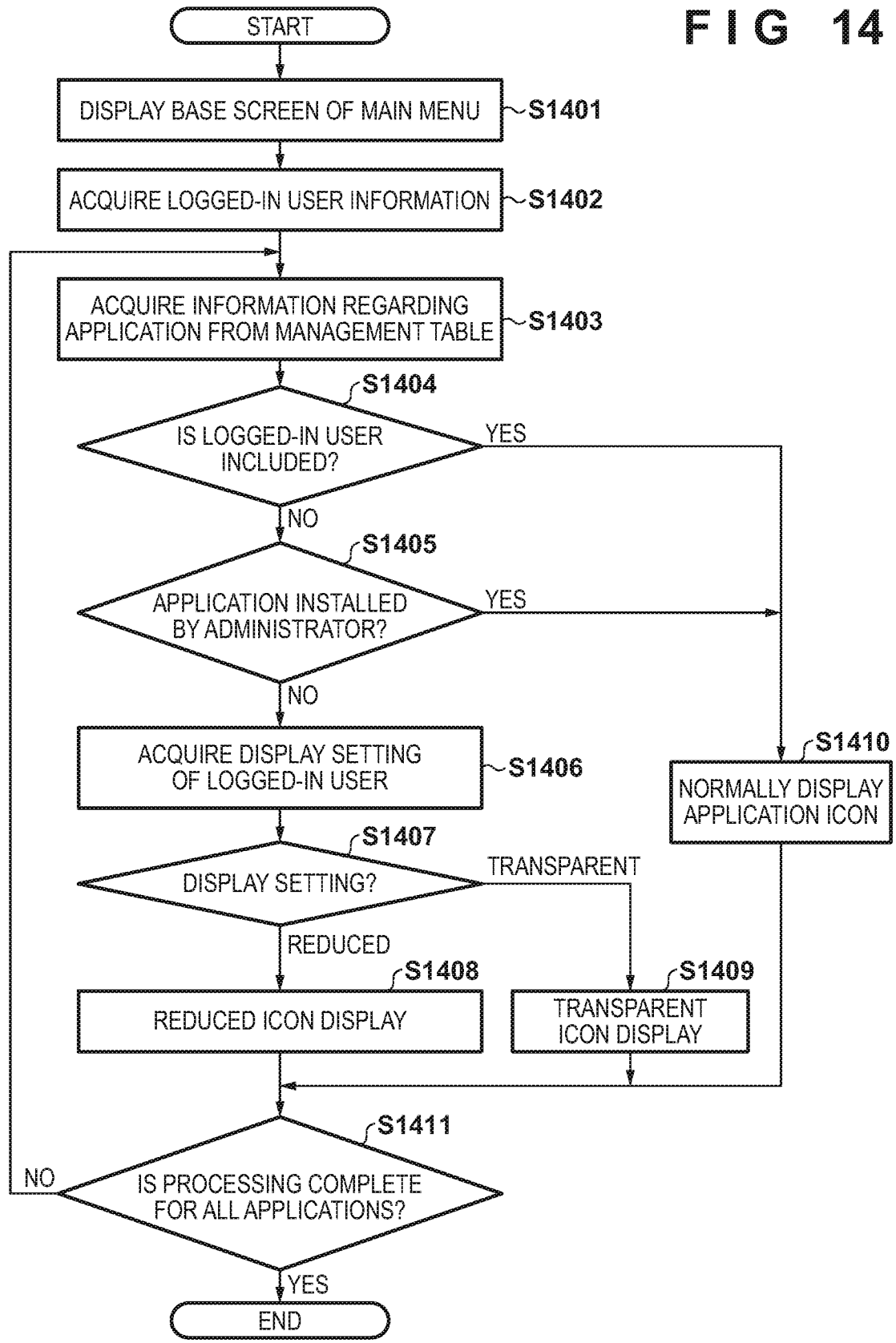

INFORMATION PROCESSING APPARATUS AND INFORMATION DISPLAY METHOD

BACKGROUND OF THE INVENTION

Field of the Invention

The present invention relates to an information processing apparatus provided with an application selection screen, and an information display method.

Description of the Related Art

In recent years, MFPs (Multi Function Peripherals) are known that are equipped with a scanner and a printer, and in which a function can be added by mounting a Java (registered trademark) execution environment, and then afterward installing an application written in Java. In such MFPs, a UI is adopted in which a list of applications is displayed using icons in an application selection screen (hereinafter, referred to as a main menu screen), and a function is selected from the list. In addition, when an application is installed in an MFP, the icon of the installed application is displayed in the main menu screen. The user can use the added function by tapping the icon displayed in the main menu screen (e.g., Japanese Patent Laid-Open No. 2012-27662).

In addition, in recent years, a large number of applications specialized for specific functions have been released in order to reduce a user operation load (e.g., a transmission function in which transmission is performed only to a mail address of the user). By installing and using an application specialized for a function that the user desires to use, the user can easily use the function of the MFP.

However, in general, an MFP is a shared device, and one device is used by a plurality of users. Therefore, if there are a plurality of users who desire to use different functions, a large number of applications for the respective functions are installed, and it is difficult for a user to find a desired application among the applications installed by other users.

SUMMARY OF THE INVENTION

The present invention provides an information processing apparatus and an information display method that make it possible for a user to easily find an application that the user desires to use, and a program.

The present invention has the following configuration.

According to an aspect of the present invention, there is provided an information processing apparatus that can install and execute an application, comprising: at least one processor; and at least one memory that stores a program causing the processor, when executed by the processor, to act as: an installation unit configured to install an application according to an instruction of a user; a registration unit configured to register, to an application management table, application management information in which user information regarding the user that instructed installation of the application is associated with the installed application; and a display control unit configured to display a list of an icon corresponding to the installed application for transitioning to a screen of the application, wherein the display control unit is configured to change a method for displaying the icon, based on user information regarding a logged-in user that has logged in the information processing apparatus and the application management table, according to whether or not the logged-in user is associated with the application corresponding to the icon.

According to the present invention, it is easy to find a desired application, and the convenience improves.

Further features of the present invention will become apparent from the following description of exemplary embodiments (with reference to the attached drawings).

BRIEF DESCRIPTION OF THE DRAWINGS

FIG. 4 is a diagram showing an example of an application management table that is managed by an application management unit 303.

FIG. 5C is a diagram showing an example of various screens that are displayed on the user interface unit 201.

FIG. 5D is a diagram showing an example of various screens that are displayed on the user interface unit 201.

FIG. 6 is a flowchart of application installation processing.

FIG. 14 is a flowchart of processing for displaying a main menu screen in the third embodiment.

DESCRIPTION OF THE EMBODIMENTS

Modes for implementing the present invention will be described below with reference to the drawings.

First Embodiment

System Configuration

Figure 1:
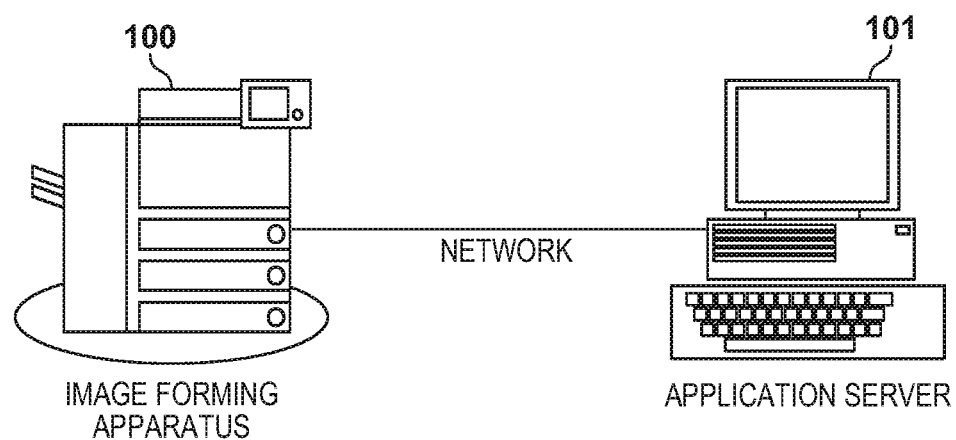
FIG. 1 is a diagram of a system configuration.

FIG. 1 is a diagram of a system configuration of a first embodiment of the present invention. An image forming apparatus 100 is a multi-functional copier (MFP) that implements an invention according to this embodiment, and is an example of an information processing apparatus that executes an information display method. The image forming apparatus 100 has a function for installing an extension application, and can download a desired extension application from an application server 101 and execute the extension application so as to dynamically add a function. The application server 101 is a server for managing an extension application that operates on the image forming apparatus 100. The application server 101 accepts a request from the image forming apparatus 100 via a network, and transmits a list of the latest versions of extension applications compatible with the image forming apparatus 100 that made the request and a file of an extension application.

Figure 2:
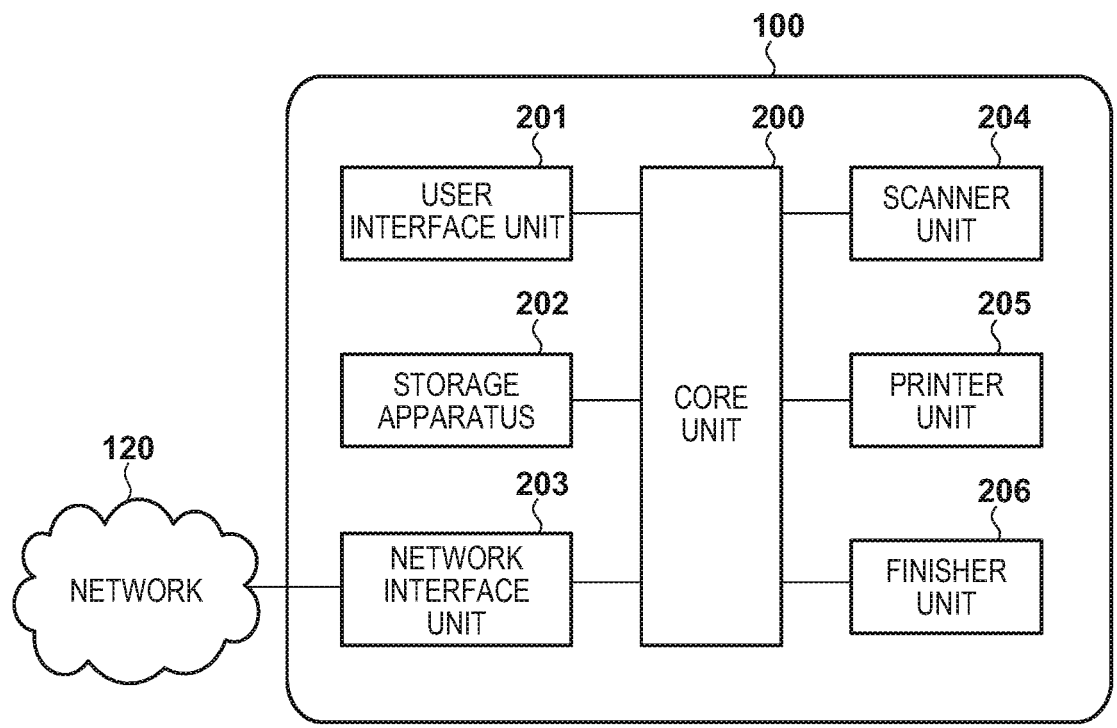
FIG. 2 is a diagram of the hardware configuration of an image forming apparatus 100.

FIG. 2 is a diagram of the hardware configuration of the image forming apparatus 100. The image forming apparatus 100 is constituted by a core unit 200 that includes a CPU (processor) and a memory, a user interface unit 201, a storage apparatus 202, a network interface unit 203, a scanner unit 204, a printer unit 205, and a finisher unit 206. The core unit 200 provides basic functions of the image forming apparatus 100 by calling and executing firmware stored in the storage apparatus 202. The basic functions provided by the firmware include a copy function, a transmission function, an extension application management function, and the like. The extension application management function is a function for adding a function that can be used in the image forming apparatus 100, by accessing the application server 101 via a network 120, and downloading and installing an extension application. The core unit 200 executes an extension application management function and provides an environment for executing an extension application. Accordingly, management of installation and uninstallation of applications, setting, and the like, provision of a user interface (UI) for such management, and execution of applications are realized. The user interface unit 201 displays a main menu screen and setting screens of various applications, and accepts input of a user operation. The storage apparatus 202 is an apparatus for storing firmware and extension applications downloaded from the application server 101. The storage apparatus 202 also stores setting information of various applications. The network interface unit 203 is an interface for connecting to the network 120. The scanner unit 204 is an apparatus for reading documents. The printer unit 205 is an apparatus for printing image data onto paper. The finisher unit 206 is an apparatus for performing various types of finishing processing on paper that has been output. An extension application is executed by the core unit 200, and provides various functions to the user by controlling the units from the user interface unit 201 to the finisher unit 206.

Software Configuration

Figure 3:
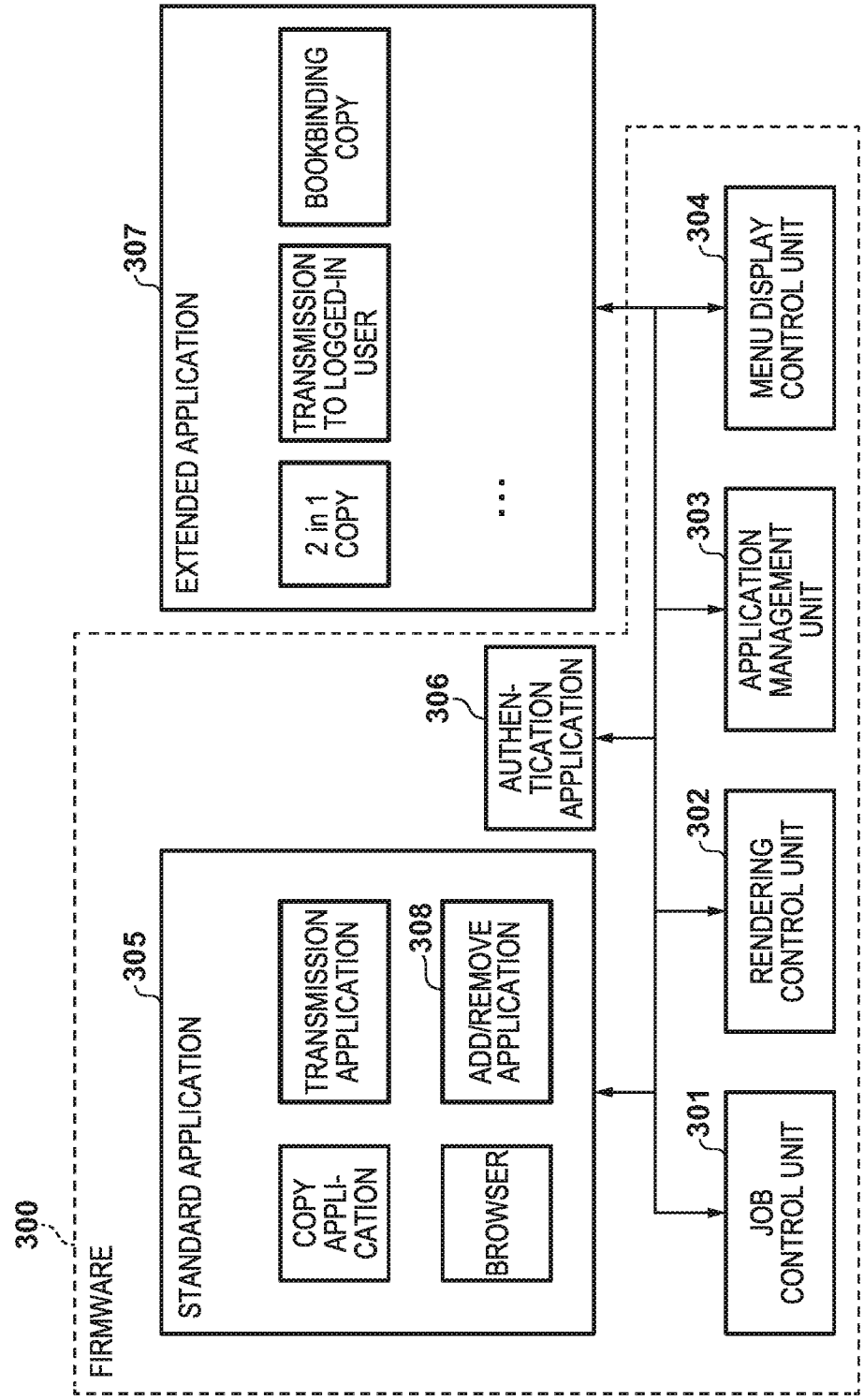
FIG. 3 is a block diagram of software that operates on an image forming apparatus 100.

FIG. 3 is an example of a block diagram of software that operates on the image forming apparatus 100. Software is executed by a processor of the core unit 200. Firmware 300 is a collection of modules 301 to 306, and is a group of software modules that are included by default. An extension application 307 is a software module that can be added or removed afterward. A job control unit 301 controls jobs such as scanning and printing upon receiving a request from a standard application or an extension application. A rendering control unit 302 is a module for controlling rendering in a screen according to a request from various applications. An application management unit 303 is a module for managing applications that can be used on the image forming apparatus 100. Specifically, the application management unit 303 adds and removes an extension application, and updates an application management table for managing information regarding an application that is operating on the image forming apparatus 100. A menu display control unit 304 is a module for displaying a main menu screen for the user to select an application that is to be used. A standard application 305 is an application that can be used in a factory shipment state, and cannot be deleted afterward. Examples of the standard application 305 include a "copy application" for performing copying, a "transmission application" for transmitting a scanned image to an external server, a "browser application" for displaying a web page. In addition, installation and uninstallation of an extension application can be performed by using a standard application called "application add/remove application 308". An authentication application 306 has a DB of user information regarding users that can use the image forming apparatus, and performs authentication when a user uses the device. Accordingly, the authentication application 306 collates user information that has been input with user information registered in advance, and performs login authentication. User information to be managed includes not only a user name and a password but also setting value information of various functions of the MFP. In addition, the authentication application 306 also provides user information regarding the user that has logged in, in other words, a logged-in user information to various applications. The extension application 307 is a module that is installed afterward. Representative examples include an application that is specialized for a specific flow so as to simplify the setting. Specifically, 2in1 copy that is always performed with 2in1 setting, a transmission application in which transmission is performed fixedly to a mail address of the user, and the like are included.

Example of Application Management Table

FIG. 4 is an example of an application management table that is managed by the application management unit 303. There is only information regarding a standard application in a state at the time of factory shipment, and when an extension application is installed and uninstalled, or settings are changed, information in the table is updated accordingly. The example in FIG. 4 is an example of a case where six extension applications were installed afterward.

An AppID 401 is an ID for identifying an application. A standard application and an extension application have different ID systems, and thus can be distinguished from each other based on their AppIDs. In this example, by taking AND of 0xf000 and ID, it can be determined that the application is a standard application if the calculation result is 0, and otherwise it can be determined that the application is an extension application. A display name 402 indicates the name of an application, and is used for displaying the application name in the main menu screen and displaying a title of the application screen. An icon 403 is information indicating an icon image that corresponds to the application, and is displayed in the main menu screen. An installation user type 404 is information indicating the type of user (general user or administrator user) who installed the application. A user list 405 is a list of user information (specifically, user names) registered as users and utilizers that installed the applications. Note that user information is not registered for a standard application. The menu display control unit 304 controls a method for displaying the icons of applications based on this user information, and performs control so as to make it easy for a user to find an application desired by the user.

Examples of User Interface

Figure 5A:
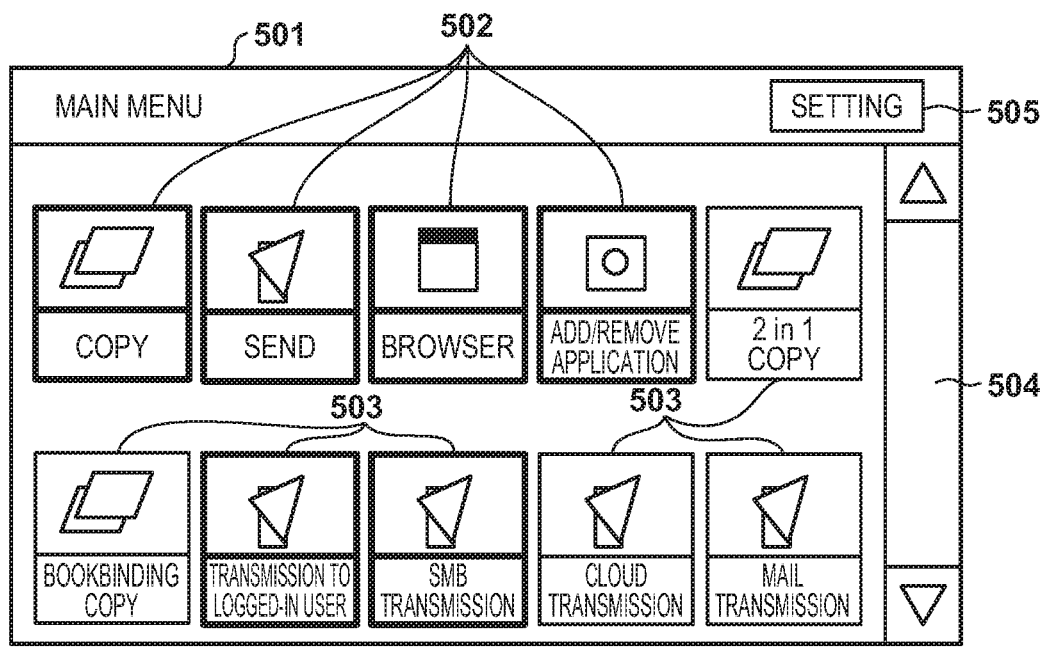
FIG. 5A is a diagram showing an example of various screens that are displayed on a user interface unit 201.

FIGS. 5A to 5D show examples of various screens displayed on the user interface unit 201. FIG. 5A shows an example of a main menu screen. This example is an example of a main menu screen in the case where a user user3 is using an image forming apparatus when the application management table is in a state of FIG. 4. A title display region 501 is a region for displaying the name of a screen that is currently displayed. This example is an example of a main menu screen, and thus "main menu" is displayed. A standard application icon 502 is an icon of a standard application. An application icon of a standard application is in a mode of being always highlighted, and is displayed with a thick frame, for example. An extension application icon 503 is an icon of an extension application that was added afterward. A normal application icon, in other words, an application icon that is not highlighted is displayed for an application for which the user that has logged in is not included in the user list of the application management table shown in FIG. 4. The user list includes users who installed the application. In the case where the user list includes the logged-in user, the application icon is displayed in a mode of being highlighted, for example, with a thick frame. An extension application installed by a user and a standard application are displayed conspicuously in this manner, and thus it is easier for the user to find a desired application. A scroll bar 504 is a UI for scrolling a screen and displaying application icons that do not fit into the screen in the case where a large number of extension applications are installed. The setting button 505 is a button for transitioning to a setting screen for setting an application that the user frequently uses (an application desired to be displayed conspicuously). Note that a thick frame of an icon is an example of highlighting, and as long as a highlighted icon and an icon that is not highlighted can be visually distinguished, highlighting is not limited to a thick frame.

Figure 5B:
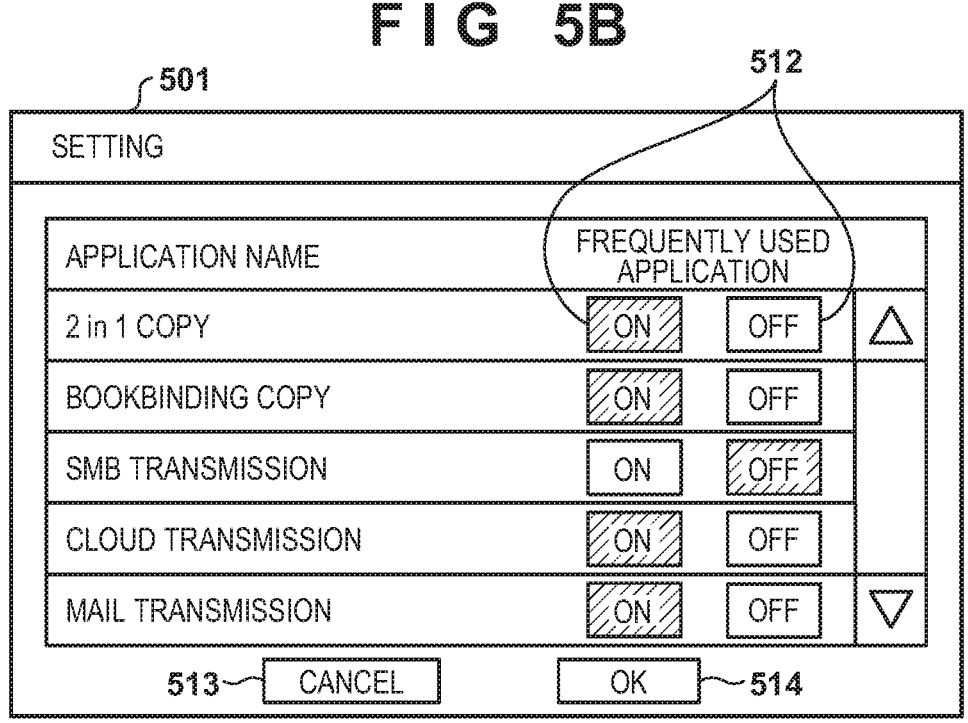
FIG. 5B is a diagram showing an example of various screens that are displayed on the user interface unit 201.

FIG. 5B is an example of a screen displayed when the setting button 505 is pressed. An extension application list 511 is a list of installed extension applications. Setting buttons 512 are displayed on the right of the list, and it is possible to set whether or not to conspicuously display extension applications. When this setting is set to ON, the icon of the extension application is displayed in a highlighted mode, for example, with a thick frame, and when this setting is set to OFF, a normal icon is displayed. A cancel button 513 is a button for discarding a content that is set, and returning to the original main menu. An OK button 514 is a button for confirming a content that is set, and returning to the main menu. When the OK button 514 is pressed, the menu display control unit 304 updates the application management table according to the content that is set.

FIG. 5C shows an example of a screen that is displayed when the application add/remove application 308 is selected from among standard applications. An application list 521 is a list of applications that can be operated on the image forming apparatus 100. The application add/remove application 308 transmits information regarding the model of the image forming apparatus 100 to the application server, a list of application information of extension applications that can be operated is acquired, and this application list 521 is generated. The application name 522 is the name of an extension application. A detail button 523 is a button for displaying a screen (not illustrated) for displaying detailed information of the corresponding application so as to allow the user to check the content of the application. A version 524 is version information of the application. In a management button display region 525, one or more buttons that can be operated for the application from among add, delete, and update buttons are displayed. In the case of an application that is not installed in the image forming apparatus 100, only an add button is displayed. In the case of an application installed in the image forming apparatus 100, a delete button is displayed. In addition, in the case where the version of an application that is installed in the image forming apparatus 100 is older than that of the application in the application server, an update button is further displayed. A back button 526 is a button for ending the application add/remove application 308, and returning to the original main menu screen.

Installation Processing of Extended Application

FIG. 6 is a flowchart showing a flow of application installation processing in the case where pressing of the add button is detected in the screen of the application add/remove application illustrated in FIG. 5C. This flow is executed by the core unit 200 in terms of hardware. Note that, in the following description, each step is executed by a software module. This applies to other flowcharts.

When pressing of the add button is detected, the application add/remove application 308 transmits an application acquisition request to the application server 101 in step S601. Next, the procedure advances to step S602, and the application add/remove application 308 receives an application requested in step S601, from the application server 101. Next, the procedure advances to step S603, and the application management unit 303 installs the application received in step S602. Next, the procedure advances to step S604, and the application management unit 303 acquires user information regarding the user that has logged in, from the authentication application 306. Specifically, user type information indicating whether the user is a general user or an administrator user, and user name information are acquired. Next, the procedure advances to step S605, and the application management unit 303 adds a row of the installed application to the application management table, writes the user information acquired in step S604, and ends the installation processing. Accordingly, in the application management table, the installed application and the user information regarding the logged-in user are registered in association. An application and user information associated with each other in the application management table may be called application management information. In this manner, an extension application is installed according to an installation instruction, and application management information regarding the application is registered in the application management table.

Setting Change Processing of Application Icon

Figure 7:
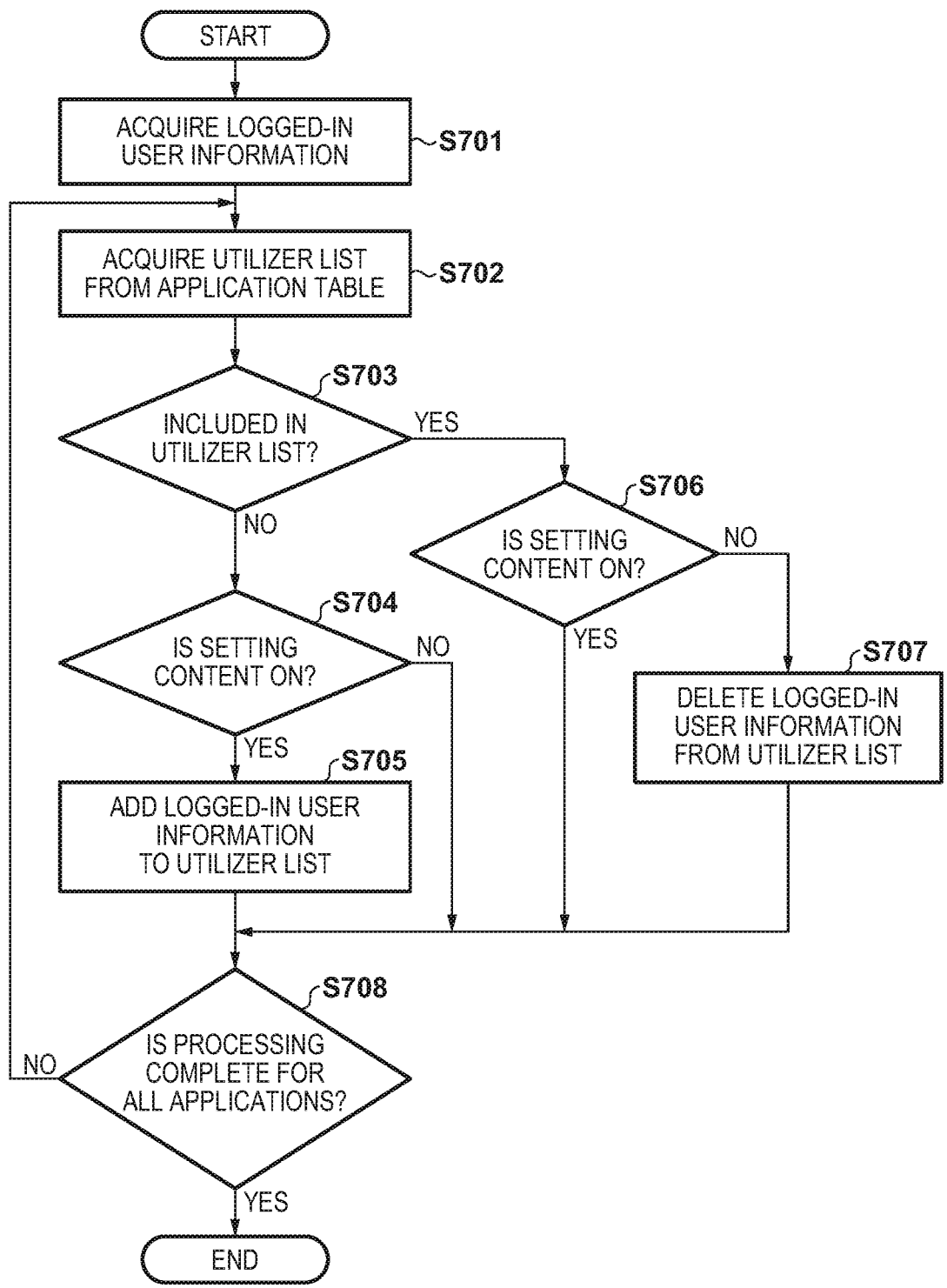
FIG. 7 is a flowchart showing a flow of setting change processing.

FIG. 7 is a flowchart showing a flow of setting change processing when the OK button was pressed in the setting screen illustrated in FIG. 5B. The processes described in FIG. 7 are all executed by the menu display control unit 304. When pressing of the OK button is detected, the menu display control unit 304 acquires user information regarding the user that has logged in, from the authentication application 306 in step S701. Next, the procedure advances to step S702, and processing in steps S702 to S708 is repeated for each of the extension applications in the application management table.

In step S702, a user list of an extension application to be processed (also referred to as a target application) is acquired from the application management table. Next, the procedure advances to step S703, and it is determined whether or not the logged-in user acquired in step S701 is included in the user list acquired in step S702. If it is determined in step S703 that the logged-in user is not included, the procedure advances to step S704. In step S704, it is determined whether or not the setting content of the extension application to be processed is ON. If it is determined that the setting content is ON, the procedure advances to step S705, and if it is determined that the setting content is not ON, the procedure advances to step S708. In step S705, the information regarding the user name of the logged-in user acquired in step S701 is added to the user list of the application management table in association with the target application, and the procedure advances to step S708. On the other hand, if it is determined in step S703 that the information regarding the user name of the logged-in user acquired in step S701 is included in the user list acquired in step S702, the procedure advances to step S706. In step S706, it is determined whether or not the setting content of the extension application to be processed is ON. If it is determined that the setting content is ON, the procedure advances to step S708, and if it is determined that the setting content is not ON, the procedure advances to step S707. In step S707, the information regarding the user acquired in step S701 is deleted from the user list associated with the target application included in the user list of the application management table, and the procedure advances to step S708. In step S708, it is determined whether or not the processing is complete for all of the extension applications in the application management table. If it is determined that the processing is not complete for all of the extension applications, the procedure returns to step S702, and if it is determined that the processing is complete for all of the extension applications, the procedure ends.

Processing for Displaying Main Menu Screen

Figure 8:
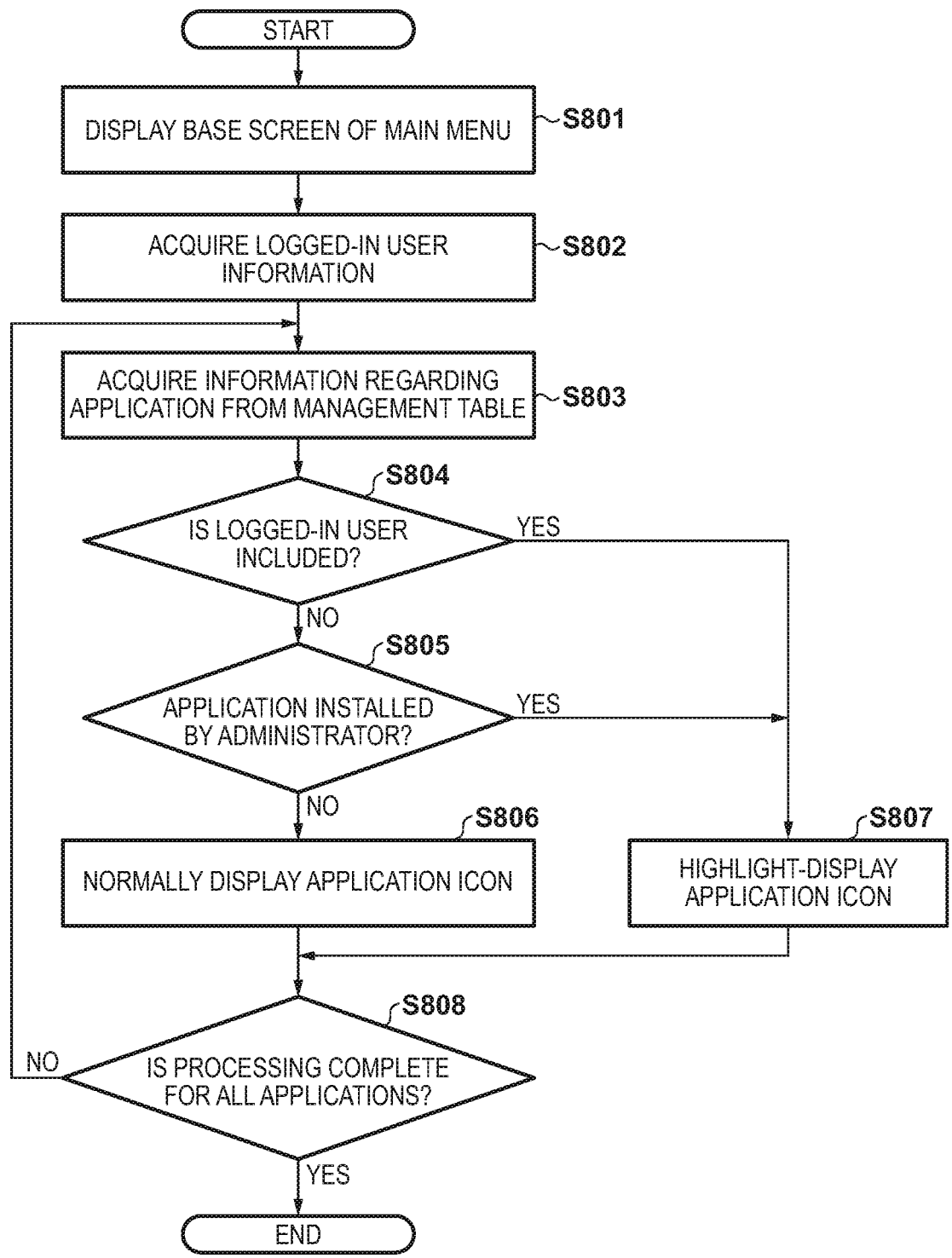
FIG. 8 is a flowchart of processing for displaying a main menu screen according to a first embodiment.

FIG. 8 is a flowchart showing a flow of processing when displaying the main menu screen illustrated in FIG. 5A. These processes are all executed by the menu display control unit 304.

When pressing of a main menu button on an operation unit is detected after a user logged in or during use of a function, the menu display control unit 304 displays a base screen (a screen that only has a pane without any application icons in FIG. 5A) of the main menu screen in step S801. Next, the procedure advances to step S802, and user information regarding a user that has logged in is acquired from the authentication application 306. Next, the procedure advances to step S803, and processing in steps S803 to S808 is repeated for all of the applications included in the application management list (both standard applications and extension applications).

First, in step S803, application management information of the target application that is to be processed is acquired from the application management table. Next, the procedure advances to step S804, the application management information acquired in step S803 is referenced, and it is determined whether or not the user that has logged in acquired in step S802 is included in the user list of the target application. If it is determined in step S802 that the logged-in user is not included, the procedure advances to step S805. In step S805, an installation user type in the application management information acquired in step S803 is referenced, and it is determined whether or not the application management is an application installed by the administrator. If it is determined in step S805 that the application is not an application installed by the administrator, the procedure advances to step S806. In step S806, icons included in the application management information acquired in step S803 are displayed on the main menu without any change, and the procedure advances to step S808. On the other hand, if it is determined in step S804 that the logged-in user is included, or if it is determined in step S805 that the application is an application installed by the administrator, the procedure advances to step S807. In step S807, the icons are highlighted. In this embodiment, by drawing a thick frame around the icon of the application, the icon is highlighted. In step S808, it is determined whether or not the processing is complete for all of the applications included in the application management table. If it is determined that the processing is not complete for all of the applications, the procedure returns to step S803, and if it is determined that the processing is complete for all of the applications, the procedure is ended. In this manner, the icons of an application installed by the administrator and an application for which the logged-in user is included in the user list are highlight-displayed, such that those applications are easily identified from among the other applications. Note that only application for which the logged-in user is included in the user list may be highlight-displayed. As described above, a list of icons can be displayed such that an application that is frequently used and an application that is not frequently used can be distinguished from each other.

Processing for Uninstalling Extended Application

Figure 9:
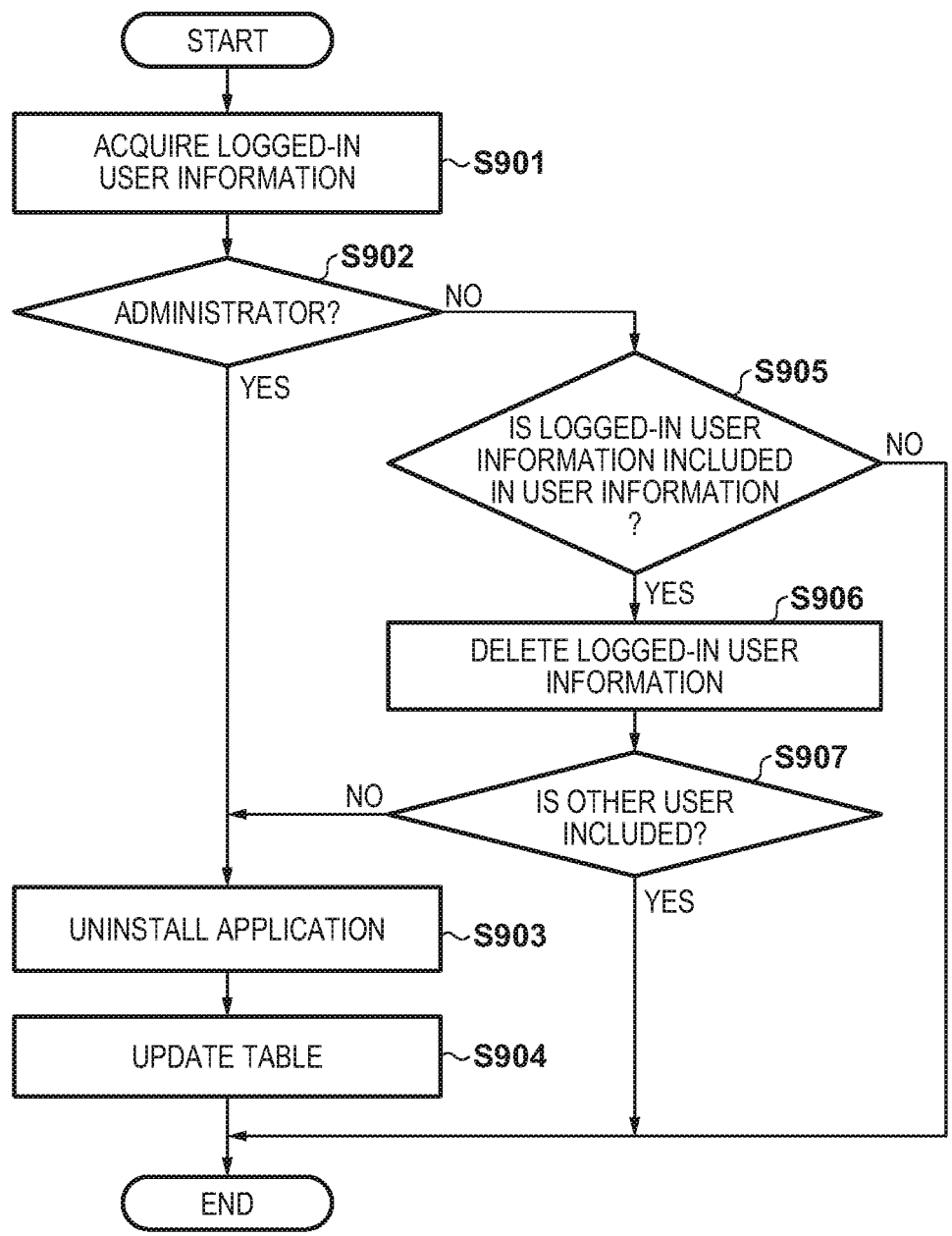
FIG. 9 is a flowchart of application uninstallation processing.

FIG. 9 is a flowchart showing a flow of processing when the delete button is pressed in the screen illustrated in FIG. 5B, and an instruction to uninstall an extension application to be uninstalled is received. This entire processing is executed by the application management unit 303. When pressing of the delete button for an extension application is detected, the application management unit 303 first acquires user information of a user that has logged in, from the authentication application 306 in step S901. Next, the procedure advances to step S902, and it is determined, based on the user information acquired in step S901, whether or not the user that has logged in is an administrator user. If it is determined that the user that has logged in is an administrator user, the procedure advances to step S903. In step S903, the extension application is uninstalled, and the procedure advances to step S904. In step S904, information regarding the extension application is deleted from the application management table, and the procedure is ended. On the other hand, if it is determined in step S902 that the user that has logged in is not an administrator user, the procedure advances to step S905. In step S905, it is determined whether or not the user that has logged in is included in the user list of the application, which is to be uninstalled, of the application management table. If the logged-in user is not included, the procedure is ended without any change. If it is determined that the user that has logged in is included, the procedure advances to step S906. In step S906, information regarding the logged-in user is deleted from the user list, of the application to be processed, of the application management table. Next, the procedure advances to step S907, and it is determined whether or not there is user information is in the user list of the application to be processed. If there is user information, the procedure is ended. If it is determined that there is no user information, the procedure advances to step S903, and the extension application is uninstalled, and in step S904, information regarding the extension application to be processed is deleted from the application management table, and the procedure is ended. As described above, even in the case where uninstallation of an extension application is instructed, if a user other than the log-in user that instructed uninstallation is included in the user list of the application, the application is not uninstalled. Instead, user information regarding the user is deleted from the user list. In addition, if the user list becomes blank by deleting user information, the target extension application is uninstalled. If the installation instruction was given by the administrative user, regardless of the content of the user list, the target extension application is uninstalled.

As described above, in the first embodiment, the icon of an application that is frequently used by a user that has logged in is highlight-displayed. Therefore, an application that has been installed by another user, and is less frequently used by the user that has logged in and an application that is frequently used by the user that has logged in are easily distinguished. Accordingly, the user easily finds the icon of an application that the user desires to use, and the convenience improves. Note that, in the first embodiment, highlight display is realized by adding a thick frame to the icon of an application that is frequently used by the user, but a configuration may be adopted in which the icon of an application that is frequently used by the user is conspicuously displayed by superimposing a star-mark icon on a corner of the icon as in FIG. 5D.

Second Embodiment

The first embodiment is an example of the case where an application that is frequently used by a log-in user is highlight-displayed so as to be conspicuous. In a second embodiment, an example of a method for making it easy for a log-in user to identify the icon of an application that is frequently used by the log-in user by inconspicuously displaying an application other than the application that is frequently used by the log-in user will be described. FIGS. 1 to 7 and 9 are the same as those in the first embodiment, and thus description thereof is omitted.

Figure 10A:
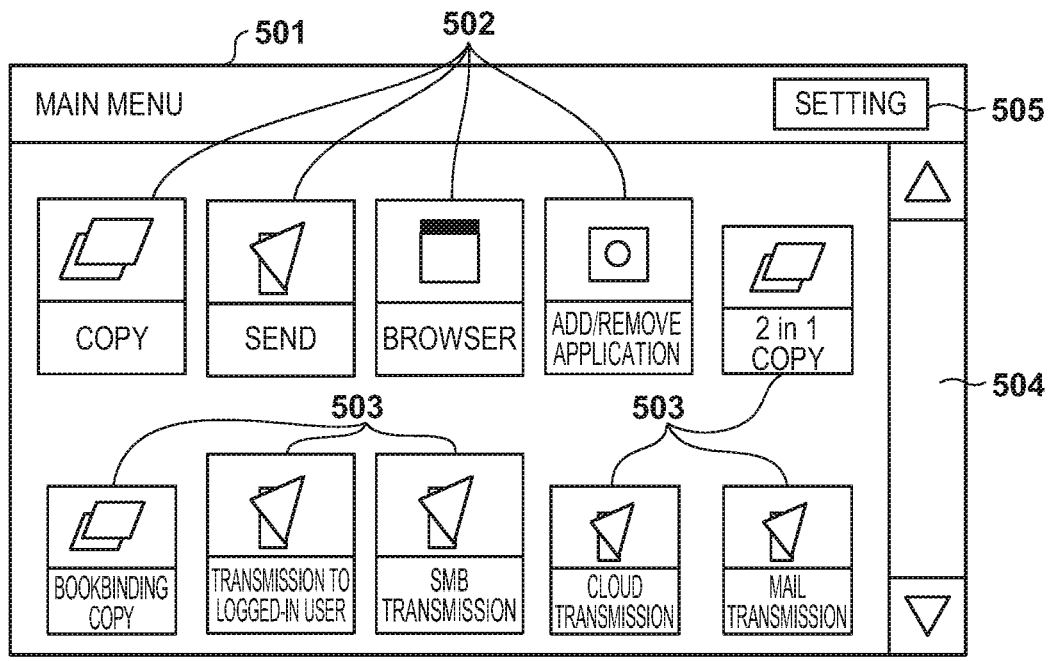
FIG. 10A is a diagram showing an example of a main menu screen in a second embodiment.
Figure 10B:
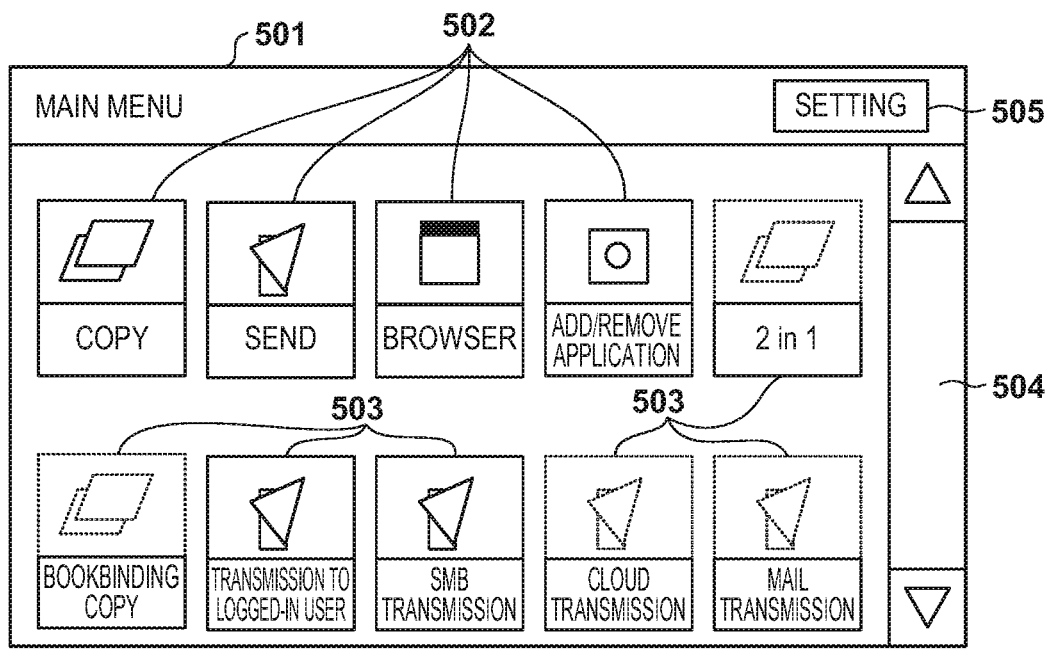
FIG. 10B is a diagram showing an example of a main menu screen in the second embodiment.

FIGS. 10A and 10B show examples of a main menu screen in the second embodiment. FIG. 10A shows an example in which the icon of an application other than an application that is frequently used by a log-in user is displayed inconspicuously by reducing the size of the icon. FIG. 10B shows an example in which the icon of an application other than an application that is frequently used by a log-in user is displayed inconspicuously by being displayed in a transparent manner. By inconspicuously displaying the icon of an extension application other than an application that is frequently used by a log-in user in this manner, it is made easy for a user to identify an extension application that is frequently used by the user.

Figure 11:
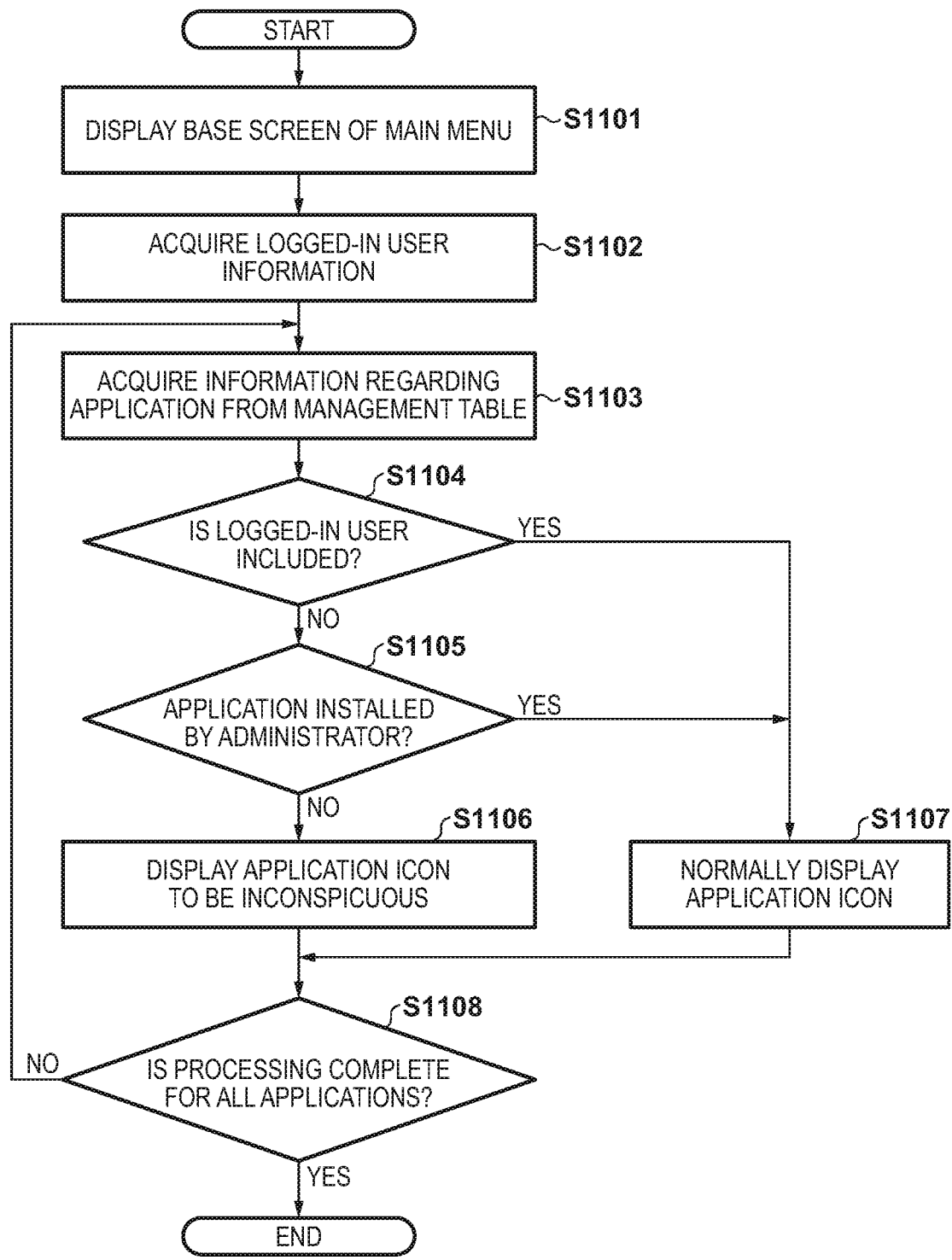
FIG. 11 is a flowchart of processing for displaying a main menu screen in the second embodiment.

FIG. 11 is a flowchart showing a flow of processing when displaying the main menu screen illustrated in FIG. 10A. These processes are all executed by a menu display control unit 304.

When pressing of a main menu button on an operation unit is detected after a user logged in and during use of a function, the menu display control unit 304 displays a base screen (a screen without any application icons in FIG. 5A) of the main menu screen in step S1101. Next, the procedure advances to step S1102, and user information regarding the user that has logged in is acquired from an authentication application 306. Next, the procedure advances to step S1103, and processing of steps S1103 to S1108 is repeated for all of the applications included in the application management list.

First, in step S1103, the application management information of a target application that is to be processed is acquired from an application management table. Next, the procedure advances to step S1104, and the application management information acquired in step S1103 is referenced, and it is determined whether or not the logged-in user whose information was acquired in step S1102 is included in a user list. If it is determined in step S1104 that the logged-in user is not included, the procedure advances to step S1105. In step S1105, an installation user type in the application management information acquired in step S1103 is referenced, and it is determined whether or not the application is an application installed by an administrator. If it is determined in step S1105 that the application is not an application installed by the administrator, the procedure advances to step S1106. In step S1106, the icon of the application is reduced in size and displayed. When icon display is performed in step S1106, the procedure advances to step S1108.

On the other hand, if it is determined in step S1104 that the logged-in user is included, or if it is determined in step S1105 that the application is an application installed by the administrator, the procedure advances to step S1107. In step S1107, the icon of the application is displayed without any change, and the procedure advances to step S1108. In step S1108, it is determined whether or not the processing is complete regarding all of the applications in the application management table. If it is determined that the processing is not complete for all of the applications, the procedure returns to step S1103, and if it is determined that the processing is complete for all of the applications, the procedure ends.

As described above, in the second embodiment, the icon of an application other than an application that is frequently used by a user that has logged in is converted into an inconspicuous form and displayed. Therefore, it is easy to distinguish between an application that has been installed by another user and is less frequently used by the log-in user and an application that is frequently used by the log-in user from each other. This makes it easy for a user to find the icon of an application that the user desires to use, and the convenience improves.

Note that, in the second embodiment, an application that is frequently used by a user can be distinguished by reducing and displaying the icon of an application other than the application that is frequently used by the user, but the present invention is not limited thereto, and as shown in FIG. 10B, the icon may be transparently displayed.

Third Embodiment

In the first and second embodiments, a method for displaying an icon is fixed due to the system, and it is conceivable that some users feel it difficult to identify an application. In a third embodiment, an example of a case will be described in which a method for displaying icons can be set for each user, and a user can select a display method by which it is easy for the user to view the screen. Note that most of the configuration is the same as the first embodiment and second embodiments, and thus only differences will be described.

Figures 12, 13:
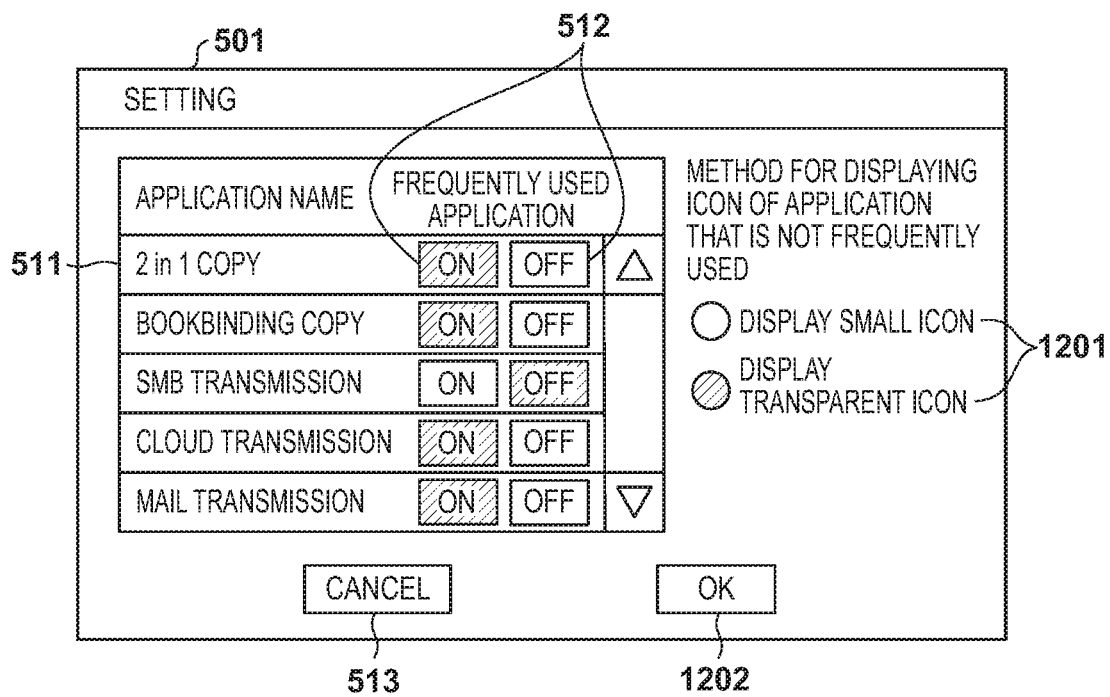
FIG. 12 is a diagram showing an example of a display setting screen in a third embodiment.
FIG. 13 is a diagram showing an example of user information in the third embodiment.

FIG. 12 is an example of a display setting screen that is displayed when a setting button on a main menu screen in the third embodiment is pressed. The setting screen of this embodiment resembles the setting screens of the first or second embodiments, but further has a UI for setting a method for displaying icons of applications that are not frequently used. Radio buttons 1201 are buttons for selecting a method for displaying icons of applications that are not frequently used, and one of these buttons can be selected. Accordingly, in the example in FIG. 12, it is possible to select whether applications that are not frequently used are displayed with small icons or transparent icons. When an OK button 1202 is pressed, an application management table is updated based on a setting content 512, and user information that is managed by an authentication application 306 is updated based on the setting content selected using the radio button 1201.

FIG. 13 shows an example of user information that is managed by the authentication application 306, and is updated when the OK button 1202 is pressed in FIG. 12. A user name 1301 is an identifier for identifying a user. A password 1302 is password information when performing user authentication. In this example, a password is directly held, but a hash value of a password may be held. A user type 1303 is information indicating whether the user is an administrator or a general user. A display setting 1304 is a setting value that can be set in a screen illustrated in FIG. 12. By holding setting values for each user in this manner, display using a display method that is based on user's preferences is possible.

FIG. 14 is a flowchart showing a flow of processing of the menu display control unit 304 when displaying the main menu screen in FIG. 10A or 10B according to settings for each user shown in FIG. 13. When pressing of a main menu button on an operation unit is detected after the user logged in or during use of a function, the menu display control unit 304 displays a base screen (a screen without any application icons in FIG. 10A) of the main menu in step S1401. Next, the procedure advances to step S1402, and user information regarding the user that has logged in is acquired from the authentication application 306. Next, the procedure advances to step S1403, and processing of steps S1403 to S1411 is repeated for all of the applications included in an application management list.

First, in step S1403, application management information corresponding to a target application that is to be processed is acquired from the application management table. Next, the procedure advances to step S1404, and it is determined whether or not the logged-in user whose information was acquired in step S1402 is included in the user list in the application management information acquired in step S1403. If it is determined in step S1404 that the logged-in user is not included, the procedure advances to step S1405. In step S1405, the installation user type in the application management information acquired in step S1403 is referenced, and it is determined whether or not the application is an application that was installed by the administrator. If it is determined in step S1405 that the application is not an application that was installed by the administrator, the procedure advances to step S1406. In step S1406, display setting information of the logged-in user is acquired from the authentication application 306, and the procedure advances to step S1407. In step S1407, determination is made regarding the content of the display setting information acquired in step S1406. If it is determined, as a result of the determination in step S1407, that the content of the display setting information is reduced display setting, the procedure advances to step S1408, and if it is determined that the content of the display setting information is transparent display setting, the procedure advances to step S1409. In step S1408, the icon of the application whose size is reduced is displayed on the main menu, and the procedure advances to step S1411. In step S1409, the icon of the application is displayed in a transparent manner on the main menu, and the procedure advances to step S1411. On the other hand, if it is determined in step S1404 that the logged-in user is included in the user list of the target application, or if it is determined in step S1405 that the application is an application installed by the administrator, the procedure advances to step S1410. In step S1410, the icon of the application is display without any change, and the procedure advances to step S1411. In step S1411, it is determined whether or not the processing is complete for all of the applications in the application management table. If it is determined that the processing is not complete for all of the applications, the procedure returns to step S1403, and if it is determined that the processing is complete all of the applications, the procedure is ended.

As described above, in the third embodiment, each user can select a method for displaying an application that is not frequently used by the user. Accordingly, a switch can be made to a display method by which it is easy for the user to view the screen, and it becomes easy for the user to identify a desired application. Note that, in the third embodiment, it is possible to switch only a method for displaying icons of applications other than an application frequently used by the user, but the present invention is not limited thereto, and a configuration may be adopted in which it is also possible to switch a method for displaying an application that is frequently used by the user. In either case, an application that is frequently used and an application that is not frequently used are displayed so as to be distinguishable for each user, and as a result, the operability and convenience can be further improved.

Fourth Embodiment

In the above embodiments, switch of display of the icons of applications has been described. However, the present patent is not limited thereto, and a configuration may be adopted in which a shortcut button such as a URL link (for starting the browser and connecting to a predetermined URL) can be switched similarly. For this purpose, the icons of applications in the above embodiments are replaced with shortcut buttons. Note that it is also possible to call a shortcut button an icon. In this case, an icon is not generated when an application is installed, and by the logged-in user giving an instruction to register an icon itself corresponding to a selected URL or the like, the icon is registered. A management table in which the icon and a user list are associated with each other is then generated in place of an application management table, and is stored. When displaying the shortcut (specifically, an icon), association with the logged-in user is tested similarly to the above embodiments, and the icon is displayed in an identifiable manner according to whether or not the shortcut and the logged-in user are associated with each other.

In addition, for ease of description, display of a standard application and display of an application installed by the administrator are displayed in the same manner as an application that is frequently used by the log-in user, but these may be displayed to be further distinguishable.

Other Embodiments

Furthermore, in the above examples, highlighting is in a static mode, a mode of changing dynamically such as blinking and color change may be adopted. In addition, for example, a configuration may be adopted in which an application that is frequently used and an application that is not frequently used are identified according to their positions on a display screen, not an icon display mode.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-172428, filed Sep. 7, 2017, which is hereby incorporated by reference herein in its entirety.

What is claimed is:

1. An information processing comprising:
    at least one processor; and
    at least one memory that stores a program causing the processor, when executed by the processor, to act as:
    an installation unit configured to install an application in accordance with a user instruction;
    a registration unit configured to register, in an application management table, application information of the installed application and user information of a user who gave an instruction to install the application in association with each other;
    a first display control unit configured to display a setting screen, wherein the setting screen is capable of receiving setting an application installed according to a setting instruction from another user as an application that is highlighted when displaying an icon of the application;
    an addition unit configured to, in a case where a setting instruction to set an application as an application that is highlighted is received via the setting screen, add user information of a user who gave the setting instruction as user information associated with the application information which is registered in the application management table;
    an determination unit configured to determine a method of displaying an icon corresponding to the application for transitioning to a screen for the application base on the user information of a logged-in user and the application management table;
    a second display control unit configured to display a list of icons corresponding to applications for transitioning to the screen for the application based on the determined method;
    wherein the second display control unit displays an icon of an application with which the user information of the logged-in user is associated in the application management table in more highlighted manner than an icon of an application with which the user information of the logged-in user is not associated.

2. The information processing apparatus according to claim 1, further comprising:
    a deletion unit configured to delete, according to an uninstallation instruction, if user information of a user other than a user that gave the uninstallation instruction is associated with a target application of the uninstallation instruction, user information of the user that gave the uninstallation instruction from the user information associated with the target application, and, if only the user that gave the uninstallation instruction is associated, uninstalling the target application.

3. The information processing apparatus according to claim 2,
    wherein, if the user that gave the uninstallation instruction is an administrator the deletion unit uninstalls the target application.

4. The information processing apparatus according to claim 1, further comprising:
    a setting unit configured to set, for each user, the display method for the second display control unit displaying the list of icons,
    wherein the second display control unit displays the list of icons according to setting performed by the setting unit.

5. The information processing apparatus according to claim 1,
    wherein the second display control unit displays an icon corresponding to the application installed by the administrator in a same manner as an icon corresponding to the application installed by the logged-in user.

6. The information processing apparatus according to claim 1, wherein the program further causes the processor to act as:
    a reception unit configured to receive an uninstall instruction to uninstall an application;
    a deletion unit configured to delete user information, wherein the user information is associated in the application management table with the application instructed to be uninstalled and is user information of a user who gave the uninstall instruction;
    a second determination unit configured to determine whether user information of a further user is included in the application management table as user information associated with the application instructed to be uninstalled;
    a control unit configured to control uninstallation of the application based on a determination result of the second determination unit;
    wherein the control unit does not perform the uninstallation of the application in a case where it is determined that the user information of a further user is included in the application management table as the user information associated with the application instructed to be uninstalled.

7. A non-transitory computer-readable medium which stores a program for causing a computer to function as an information processing method that can install and execute an application, the method comprising:
    installing an application in accordance with a user instruction;
    registering, in an application management table, application information of the installed application and user information of a user who gave an instruction to install the application in association with each other;
    displaying a setting screen, wherein the setting screen is capable of receiving setting an application installed according to a setting instruction from another user as an application that is highlighted when displaying an icon of the application;
    in a case where a setting instruction to set an application as an application that is highlighted is received via the setting screen, adding user information of a user who gave the setting instruction as user information associated with the application information which is registered in the application management table;

determining a method of displaying an icon corresponding to the application for transitioning to a screen for the application base on the user information of a logged-in user and the application management table;

displaying a list of icons corresponding to applications for transitioning to the screen for the application based on the determined method;

wherein an icon of an application with which the user information of the logged-in user is associated in the application management table is displayed in more highlighted manner than an icon of an application with which the user information of the logged-in user is not associated.

8. An information display method that is executed by an information processing apparatus that can install and execute an application, the method comprising:

installing an application in accordance with a user instruction;

registering, in an application management table, application information of the installed application and user information of a user who gave an instruction to install the application in association with each other;

displaying a setting screen, wherein the setting screen is capable of receiving setting an application installed according to a setting instruction from another user as an application that is highlighted when displaying an icon of the application;

in a case where a setting instruction to set an application as an application that is highlighted is received via the setting screen, adding user information of a user who gave the setting instruction as user information associated with the application information which is registered in the application management table;

determining a method of displaying an icon corresponding to the application for transitioning to a screen for the application base on the user information of a logged-in user and the application management table;

displaying a list of icons corresponding to applications for transitioning to the screen for the application based on the determined method;

wherein an icon of an application with which the user information of the logged-in user is associated in the application management table is displayed in more highlighted manner than an icon of an application with which the user information of the logged-in user is not associated.

* * * * *